Feb. 21, 1956     T. S. FARLEY     2,735,882

THERMOCOUPLE

Filed May 27, 1954

INVENTOR.
THOMAS S. FARLEY
BY
Harry M. Saragovitz
ATTORNEY

United States Patent Office 2,735,882
Patented Feb. 21, 1956

2,735,882

THERMOCOUPLE

Thomas S. Farley, Fair Haven, N. J.

Application May 27, 1954, Serial No. 432,949

3 Claims. (Cl. 136—4)

(Granted under Title 35, U. S. Code (1952), sec. 266)

This invention described herein may be manufactured and used by or for the Government for governmental purposes, without the payment of any royalty thereon.

The present invention relates to thermocouples.

The invention has particular reference to a thermocouple for use as an instrument in measuring temperatures, such, for instance, as pyrometers of the type which determine temperatures from the measure of the strength of the thermoelectric currents produced by heating the junction of two different metals or metal alloys.

Thermocouples, as described above, have long been used as pyrometers for measuring surface temperatures. However, so far as is known, such thermocouples have been made by joining the ends of two wires or sheets of dissimilar metals wherein the ends so joined were used as the point in contact with the item under temperature consideration. Obviously a very small point-to-contact area was provided by such thermocouples and thus minute and very small differences in temperatures on a surface could not be readily obtained. Other forms of thermocouples, for use as pyrometers, have been designed including some wherein the two wires of the thermocouple were twisted or braided so that a greater surface area for contact with a surface could be provided. While such pyrometers were an improvement of the first mentioned type in affording greater surface area on the test surface, it was still found that optimum efficiency as a pyrometer could not be obtained in measuring extremely fine differences in temperature.

It is accordingly a primary object of the present invention to provide a pyrometer that is extremely sensitive to changes in temperature by providing an increased or layer area of surface contact between the thermocouple and the object whose temperature is being measured.

Another object of the invention is to provide a thermocouple that can be readily attached to surfaces where the material cannot be easily machined or roughened, such as the glass surface of an electron discharge device.

Another object of the invention is to provide a thermocouple pyrometer which can be readily applied to any type of surface whether flat, curved, or cylindrical, and is adaptable for use in ordinarily inaccessible sections of equipment.

These and other objects and features of the invention will be readily apparent as the description of the device proceeds to be read in view of the accompany drawing in which.

Figure 1:
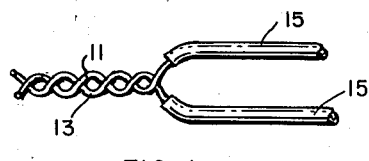
Figures 1–5 are views showing the successive or consecutive stages of fabrication of the thermocouple with Figure 3 being an end elevational view of the device in its fabrication during the stage shown in Figure 2.
Figure 3:
Figure 2:
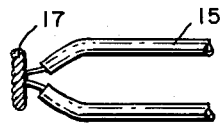
Figure 4:
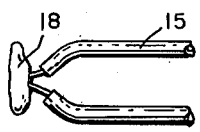
Figure 5:
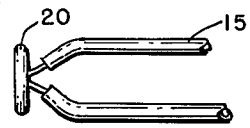

The thermocouple itself can best be described by its method of fabrication, and in this regard reference is made to Figure 5 wherein there is shown a completed pyrometer incorporating the unique thermocouple of the present invention. The initial step is to first clean the two dissimilar metals that make up the thermocouple. In the particular embodiment herein, relatively fine wires 11 and 13 of iron and constantan respectively, were used. Short sections of each wire are exposed, with the remainder of each wire covered by insulation 15. The exposed ends of wires 11 and 13 are interlaced to form a braided portion as shown in Figure 1. The braided portion is then twisted about itself to form a flattened spiral of braided wire to provide a loop 17 as shown in Figure 3. It is obvious that such spirally wound braided wires present a considerably greater amount of point contact surface as a thermocouple junction than the mere braided wires before being spirally wound, such as was common in prior art devices. The spirally wound loop 17 is then soldered, preferably with a high melting point solder 18, such as silver solder which has a melting point in the neighborhood of 1000° F. The soldered loop is then machined so that upon completion of such machining step, the surface of loop 17 will be free of all irregularities and a flat surface area 20 is provided for contacting the object under test. As a final step in the fabrication of the thermocouple, the machined loop is plated, such as with chrome plating.

Figure 6:
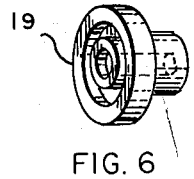
Figure 6 is a view in perspective showing one form of envelope in which the thermocouple may be contained.

In Figure 6 there is shown a means for securing and holding the aforedescribed thermocouple in position. Due to the minute size of the device, handling thereof might be rather difficult. To overcome this difficulty, a substantially cup-shaped container 19 may be provided in which the thermocouple can be confined. The container 19 is so designed and made as to permit the loop of the thermocouple to lie substantially flush with the outer peripheral surface of the container.

Figure 7:
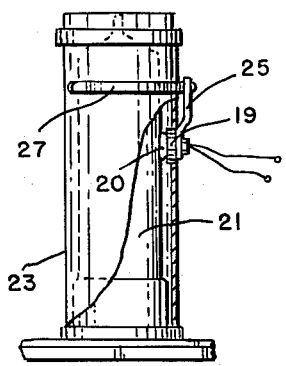
Figure 7 is an elevational view showing the thermocouple applied to an electron tube.

In Figure 7 there is shown a typical application of the device herein described wherein it is utilized to measure the heat transmission characteristics of tube shields and the actual glass envelope temperature of an electron tube. In the example shown an electronic tube 21 is surrounded by a shield 23. The shield 23 is provided with an opening into which there can be placed the thermocouple 20 of this invention. The thermocouple in contact with the tube 21 is confined in cup 19 which in turn is held by a spring 25 which in turn is secured to a clip 27 which grasps the shield 23.

Figure 8:
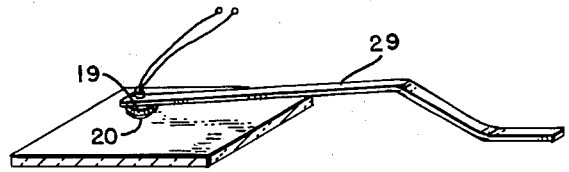
Figure 8 shows another type of application of the present invention.

In Figure 8 there is shown another application of the invention wherein the cup 19 having the contact thermocouple confined therein, is affixed to one end of the springlike rod or support 29. In such usage the thermocouple is utilized for conducting temperature measurements in the center, or any portion of a large piece of glass.

Figure 9:
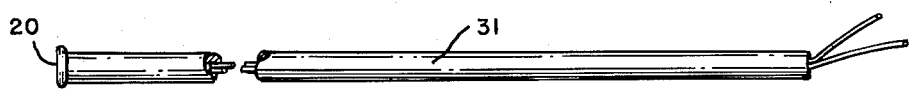
Figure 9 shows a typical form of device, such as a probe, in which the thermocouple of this application can be incorporated.

In Figure 9 there is shown another application of the invention wherein the thermocouple loop and its enveloping cup are secured to the end of a tubular plastic probe 31. Such probe can be used to take temperature readings on flat, curved or inaccessible cavities.

It is to be understood throughout this description, although no mention has been so made, the other ends of the wires 11 and 13 terminate in an appropriate conventional electrical indicating, recording, or measuring instrument.

While there have been described what are at present considered to be the preferred embodiments of this invention, it will be obvious to those skilled in the art that various changes and modifications may be made therein without departing from the invention, and it is, therefore, aimed in the appended claims to cover all such changes

What is claimed is:

1. A thermocouple comprising two metals intimately twisted about each other to form a braid, said braid being spirally wound in a plurality of turns in substantial contact with each other to constitute a substantially flat disk for engaging a surface, the temperature of which is to be determined.

2. A thermocouple of the type set forth in claim 1 with means for supporting said thermocouple whereby said thermocouple may be maintained in intimate contact with the surface, the temperature of which is to be determined.

3. A thermocouple comprising two wires intimately braided and spirally wound in a plurality of turns in substantial contact with each other to constitute a substantially flat disk having a relatively large area.

References Cited in the file of this patent

UNITED STATES PATENTS

| | | |
|---|---|---|
| 1,140,701 | Mitchell | May 25, 1915 |
| 2,519,785 | Okolicsanyi | Aug. 22, 1950 |

FOREIGN PATENTS

| | | |
|---|---|---|
| 58 | Great Britain | of 1875 |
| 893,077 | France | Jan. 17, 1944 |